(12) United States Patent
Boelter et al.

(10) Patent No.: US 9,798,000 B2
(45) Date of Patent: Oct. 24, 2017

(54) SYSTEM AND METHOD FOR INDOOR GEOLOCATION AND MAPPING

(71) Applicant: INTEL CORPORATION, Santa Clara, CA (US)

(72) Inventors: Joshua Boelter, Portland, OR (US); Paul J. Gwin, Orangevale, CA (US); Ayeshwarya B. Mahajan, Bangalore (IN); Geoff Y. Schreiber, Portland, OR (US); Mark E. Sprenger, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/359,482

(22) PCT Filed: Dec. 10, 2013

(86) PCT No.: PCT/US2013/074013
§ 371 (c)(1),
(2) Date: May 20, 2014

(87) PCT Pub. No.: WO2015/088490
PCT Pub. Date: Jun. 18, 2015

(65) Prior Publication Data
US 2015/0219757 A1    Aug. 6, 2015

(51) Int. Cl.
*G01S 13/06*    (2006.01)
*G01S 7/02*    (2006.01)
(Continued)

(52) U.S. Cl.
CPC ............ *G01S 13/06* (2013.01); *G01C 21/206* (2013.01); *G01S 7/02* (2013.01); *G01S 13/0209* (2013.01);
(Continued)

(58) Field of Classification Search
CPC .................................................... G01C 21/206
(Continued)

(56) References Cited

U.S. PATENT DOCUMENTS

2004/0145470 A1 *   7/2004   Fager .................... G01S 5/0018
                                                    340/539.13
2004/0148125 A1 *   7/2004   Fager ...................... G01S 5/163
                                                    702/150
(Continued)

FOREIGN PATENT DOCUMENTS

WO    2013/117723 A1    8/2013
WO    2015/088490 A1    6/2015

OTHER PUBLICATIONS

Micropower Impulse Radar, Science and Technology Review Jan./Feb. 1996, p. 17-29.*
(Continued)

*Primary Examiner* — Krishnan Ramesh
(74) *Attorney, Agent, or Firm* — Schwabe, Williamson & Wyatt, P.C.

(57) ABSTRACT

Methods and systems to provide location and navigation information to a user within a building. In an embodiment, low power radars may be used to locate and track a user. Moreover, the systems and methods described herein may take advantage of the known layout of a building, or may ascertain the layout using the radar devices. This information may be used to direct a user from a current location to a desired destination. In some contexts, such as stores, radio frequency ID (RFID) tags may be used to identify a particular destination, such as a particular product in a particular aisle in a store. Multiple persons may be tracked as they move about the building, so that the more frequently used paths may be identified for moving from point to point.

(Continued)

These identified paths may then be used in constructing a path for a user who needs directions.

18 Claims, 6 Drawing Sheets

(51) Int. Cl.
| | | |
|---|---|---|
| *G01S 13/66* | (2006.01) | |
| *G01S 13/02* | (2006.01) | |
| *G01S 13/68* | (2006.01) | |
| *G01S 13/74* | (2006.01) | |
| *G01C 21/20* | (2006.01) | |
| *G01S 13/87* | (2006.01) | |

(52) U.S. Cl.
CPC .............. *G01S 13/66* (2013.01); *G01S 13/68* (2013.01); *G01S 13/74* (2013.01); *G01S 13/878* (2013.01)

(58) Field of Classification Search
USPC .......................................................... 342/59
See application file for complete search history.

(56) References Cited

U.S. PATENT DOCUMENTS

| | | | | |
|---|---|---|---|---|
| 2006/0170584 | A1* | 8/2006 | Romero | A61B 5/0507 342/22 |
| 2006/0247847 | A1* | 11/2006 | Carter | B60T 7/18 701/498 |
| 2007/0182618 | A1* | 8/2007 | Fullerton | G01S 7/003 342/28 |
| 2007/0222679 | A1* | 9/2007 | Morris | G01S 13/878 342/407 |
| 2008/0074312 | A1* | 3/2008 | Cross | G01S 7/20 342/25 A |
| 2008/0248815 | A1* | 10/2008 | Busch | H04W 4/02 455/456.5 |
| 2009/0043502 | A1* | 2/2009 | Shaffer | G01C 21/20 701/469 |
| 2012/0022785 | A1 | 1/2012 | DiBernardo et al. | |
| 2012/0072106 | A1 | 3/2012 | Han et al. | |
| 2012/0087212 | A1 | 4/2012 | Vartanian et al. | |
| 2012/0313807 | A1* | 12/2012 | Yanagi | G01S 7/04 342/59 |
| 2013/0106642 | A1* | 5/2013 | Tomich | G01S 13/003 342/22 |
| 2013/0165770 | A1* | 6/2013 | Li | A61N 5/1049 600/430 |
| 2013/0314104 | A1* | 11/2013 | Lammel | G01C 21/12 324/629 |
| 2014/0062759 | A1* | 3/2014 | Morikawa | G01S 17/42 342/59 |
| 2014/0099974 | A1* | 4/2014 | Chun | H04W 4/043 455/456.3 |
| 2014/0274165 | A1* | 9/2014 | Wu | H04W 4/043 455/457 |
| 2014/0368378 | A1* | 12/2014 | Crain | G01S 5/02 342/25 A |
| 2015/0192668 | A1* | 7/2015 | Mckitterick | G01S 13/89 702/159 |
| 2015/0204678 | A1* | 7/2015 | Schuster | B66B 1/468 701/522 |
| 2016/0069992 | A1* | 3/2016 | Rector | G01S 13/003 342/59 |
| 2016/0109566 | A1* | 4/2016 | Liu | G01S 13/867 342/52 |

OTHER PUBLICATIONS

Azevedo, et al., "A New Pocket-Sized Radar that Operates up to Several Years on AA Batteries", Micropower Impulse Radar, IEEE Potential, Apr.-May 1997, pp. 15-20.

Gupta, et al., "FM-UWB for Radar and Communications in Medical Applications", First International Symposium on Applied Sciences on Biomedical and Communication Technologies, ISABEL '08, IEEE, Oct. 25-28, 2008, 5 pages.

Camero, "Xaver™ 400", Compact, Tactical Through-Wall Imaging System, Camero-Tech Ltd., 2 pages.

Chang, et al., "UWB Human Detection Radar System: A RF CMOS Chip and Algorithm Integrated Sensor", IEEE International Conference on Ultra-Wideband (ICUWB), 2011, pp. 355-359.

Dutta, et al., "Towards Radar Enabled Sensor Networks", ACM, 2006, pp. 467-474.

Gupta, et al., "Development of a High Resolution UWB Sensor for Estimation of Transfer Function of Vocal Tract Filter", IEEE, 2007, pp. 131-134.

Hussain, Malek G.M., "Ultra-Wideband Impulse Radar—An Overview of the Principles", IEEE, AES Systems Magazine, Sep. 1998, pp. 9-14.

Lawrence Livermore National Laboratory, "Urban Eyes: Ultra-wideband (UWB) Detecting and Tracking", UCRL-PRES-217242, 9 pages.

Mahfouz, et al., "The Future of Ultra Wideband Systems in Medicine: Orthopedic Surgical Navigation", Novel Applications of the UWB Technologies, ISBN: 978-953-307-324-8, InTech, 2011, 43 pages.

Nguyen, Lam, "Image Resolution Computation for Ultra-Wideband (UWB) Synchronous Impulse Reconstruction (SIRE) Radar", Army Research Laboratory, ARL-TN-294, Sep. 2007, 26 pages.

Pan, Jianli, "Medical Applications of Ultra-WideBand (UWB)", Apr. 2008, 12 pages.

Chase, Ron, "UWB: Fostering Innovation Through a Balanced Regulatory Framework", Apr. 11, 2006, 37 pages.

Zaikov, et al., "UWB Radar for Detection and Localization of Trapped People", Ultra Wideband, ISBN: 978-953-307-139-8, InTech, Aug. 17, 2010, 25 pages.

International Search Report and Written Opinion received for PCT Patent Application No. PCT/US2013/074013, dated Sep. 15, 2014, 13 pages.

* cited by examiner

SYSTEM AND METHOD FOR INDOOR GEOLOCATION AND MAPPING

TECHNICAL FIELD

Embodiments described herein relate to geolocation.

BACKGROUND

Geolocation technology has been generally available to consumers for several years. Global Positioning System (GPS) devices are commonly built into automobiles, and are readily available as portable devices. As a result, a user may now easily find his current location when in a vehicle or when walking, and can navigate through a city or across a continent using this technology. The user is presented with electronic maps, and can be given point-to-point directions upon request.

In other situations, however, a user may require navigational assistance on a more local level. In particular, some buildings and other structures can have complicated layouts, such that navigating such a building or structure can be difficult. Shopping malls may cover several acres, for example, and may have multiple wings and several floors. Airports may resemble small cities, and have numerous terminals, waiting areas, and baggage claim facilities. Subway stations may have several train platforms that may be located on any of several levels.

In these situations, the value of current GPS technology is limited. Most notably, the signaling that is used in GPS systems is generally unable to penetrate dense building materials, such as the concrete, metal, and other materials that may be used in the walls and roofs of a building. As a result, traditional GPS is generally unable to assist a user in navigation of indoor facilities such as those mentioned above.

BRIEF DESCRIPTION OF THE DRAWINGS/FIGURES

Figure 1:
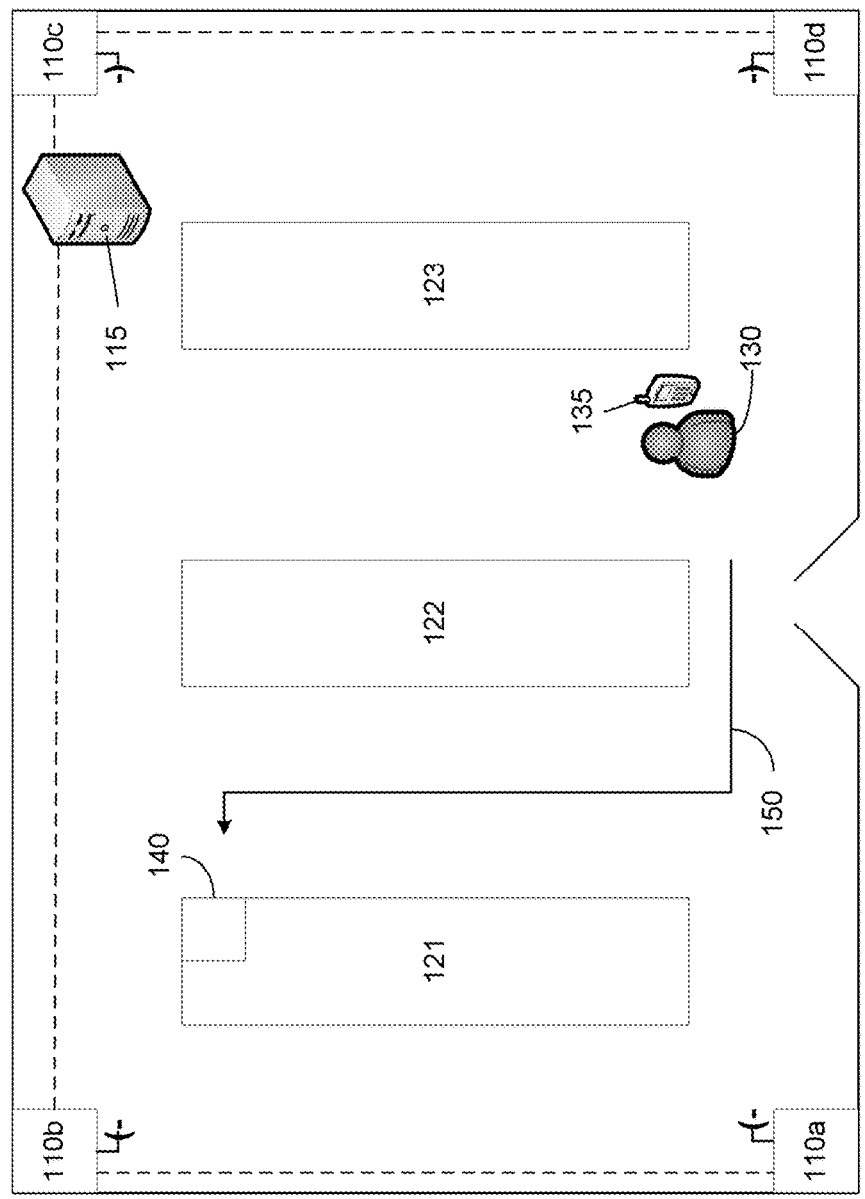
FIG. 1 illustrates an exemplary operational setting for the systems and methods described herein, according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to provide location and navigation information to a user within a building. In an embodiment, low power radars may be used to locate and track a user. Moreover, the systems and methods described herein may take advantage of the known layout of a building, or may ascertain the layout using the radar devices. This information may be used to direct a user from a current location to a desired destination. In some contexts, such as stores, radio frequency ID (RFID) tags may be used to identify a particular destination, such as a particular product in a particular aisle in a store. Multiple persons may be tracked as they move about the building, so that the more frequently used paths may be identified for moving from point to point. These identified paths may then be used in constructing a path for a user who needs directions.

FIG. 1 illustrates a situation where the systems and methods described herein may be implemented. A floor plan of a building 100 is illustrated. Four radar devices are present in the illustrated embodiment, shown here as 110*a*, . . . 110*d*. While four radar devices are shown, it is to be understood that a greater or lesser number may be used in alternative embodiments. In an embodiment, each of these radar devices may be a micropower impulse radar (MIR). In an embodiment, each MIR may have a range of 100 feet and may be relatively low powered, e.g., approximately 100 microwatts. Their respective locations in the building may be predetermined; alternatively, their locations may be ascertained after installation, using triangulation techniques and ultra-wideband (UWB) radio frequency ID (RFID) tags affixed to each radar device. The radar devices 110*a*, . . . 110*d* may each transmit radar pulses in a range of directions, and may then note the direction from which a reflection is received. Given the location of each radar device, the directions from which the reflections arrive can yield the location of an object (e.g., user 130). Note that while FIG. 1 illustrates a one-floor building, the systems and methods described herein may also operate in a three-dimensional setting, where the building may have multiple floors. Here, the user's location may be identified in three-dimensional space.

By combining this direction information from the radar devices 110*a*, . . . 110*d*, the location of user 130 may be ascertained using triangulation, for example. In an embodiment, the direction information may be sent from each of the radar devices 110*a*, . . . 110*d* to a computing device 135 carried by the user 130. This user device 135 may be any computing device, such as a smartphone, tablet, or wearable computing device for example. An application running on a processor in such a user device 135 may perform the triangulation or other calculation and may then inform user 130 of his location. Such a processor in user device 135 may therefore serve as a location processor. The communication of the direction information from the radar devices to the user device 135 may take place using any protocol or process known to persons of ordinary skill in the art. In various embodiments, this communication may take place using wi-fi, or using UWB packets. In an embodiment, the user device 135 may include an RFID tag, to allow identification of the particular user 130.

Alternatively, the direction information may be sent from the radar devices 110*a*, . . . 110*d* to a processor unit 115, which may then perform the triangulation or other calculation using an application program executing on a location processor to determine the location of user 130. This location information may then be transmitted to the user device 135 from the processor unit. In such an embodiment, the radar devices 110*a*, . . . 110*d* may be in communication with each other and with the processor unit 115, as shown by the dashed lines. In embodiments, these communications may take place using wi-fi or using UWB packets.

Note that while the processor unit 115 is shown in the building, in an alternative embodiment the processor unit 115 may be offsite. Moreover, this unit may take the form of any programmable computing device, such as a server, for example.

In addition, the location of user 130 may be determined repeatedly, and these locations compiled to determine the movement of user 130. In this way, the direction in which user 130 is heading may be determined. Again, such a determination may be performed either at the user device 135, or by the processor unit 115 and communicated to the user device.

Moreover, the movement of multiple persons may be similarly determined. This may allow for the determination of the most frequently used paths through building 100. This information may be used if the user 130 asks for assistance in navigating building 100. The user 130 may ask for directions regarding how to go from his current location to a desired destination 140, for example. In an embodiment, this query may be directed to processor unit 115. In the context of a supermarket, for example, destination 140 may be the location of a particular item, and may be marked by an RFID tag to allow mapping of the item to the location. By having determined the most frequently used paths through building 110, this may then allow the identification and recommendation of a path 150 for the user in response to his query, where the path is determined using a crowd-sourced approach based on the most popular paths. In various embodiments, the determination of the most frequently used paths and the construction of a path for the user may be performed by the processor unit 115 or by user device 135.

In an embodiment, the layout of building 100 may be made available to the system described here, and stored. Alternatively, the layout of building 100 may be ascertained using the radar devices 110*a*, . . . 110*d*. This latter approach may be used, for example, to determine the presence and location of obstructions 121, 122, and 123. These obstructions may be support structures, walls, or partitions, for example, or shelves in a store. The layout may be then used in constraining a path for user 130.

Figure 2:
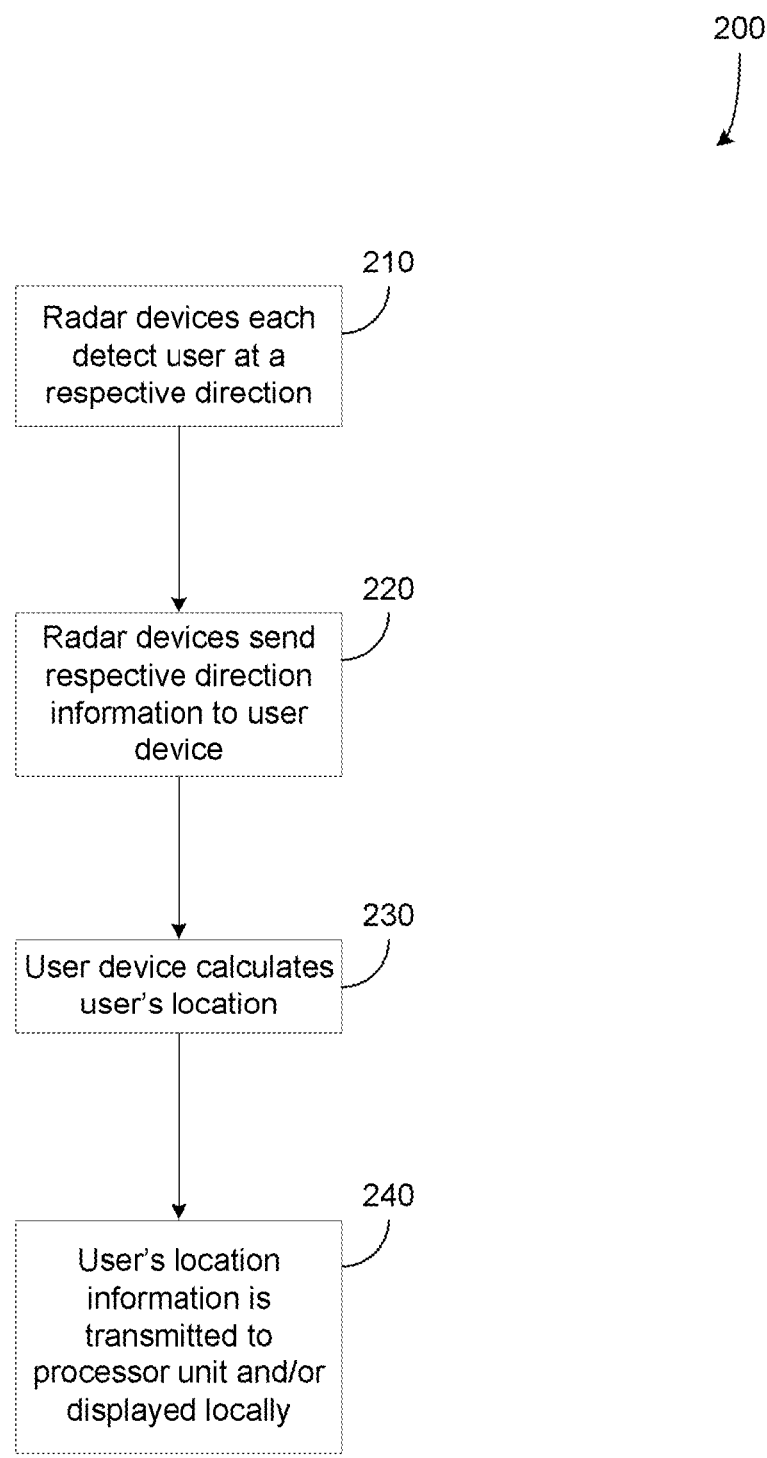
FIG. 2 is a flow chart illustrating the determination of a user's location, according to an embodiment.

The determination of a user's location in a building is illustrated in FIG. 2, according to an embodiment. At 210, each of the radar devices detects the user's location at a respective direction, given the different location of each radar device. At 220, the radar devices each send their direction information to a user device. At 230, a location processor in the user device may calculate the user's location based on the direction information received from the radar devices. A triangulation algorithm may be used for this purpose in an embodiment. At 240, the user's calculated location may be transmitted to the processor unit and/or may be displayed locally to the user. As mentioned above, the processor unit may compile the user's location information over a time interval to determine his movement along a path; the processor unit may further compile the paths taken by multiple users in order to determine the most frequently used paths through a building.

Note that in an alternative embodiment, the direction information collected by the radar devices may be sent instead to the processor unit, where a location processor may then calculate the user's location. In such an embodiment, the calculated location information may then be saved at the processor unit and transmitted to the user's device.

Figure 3:
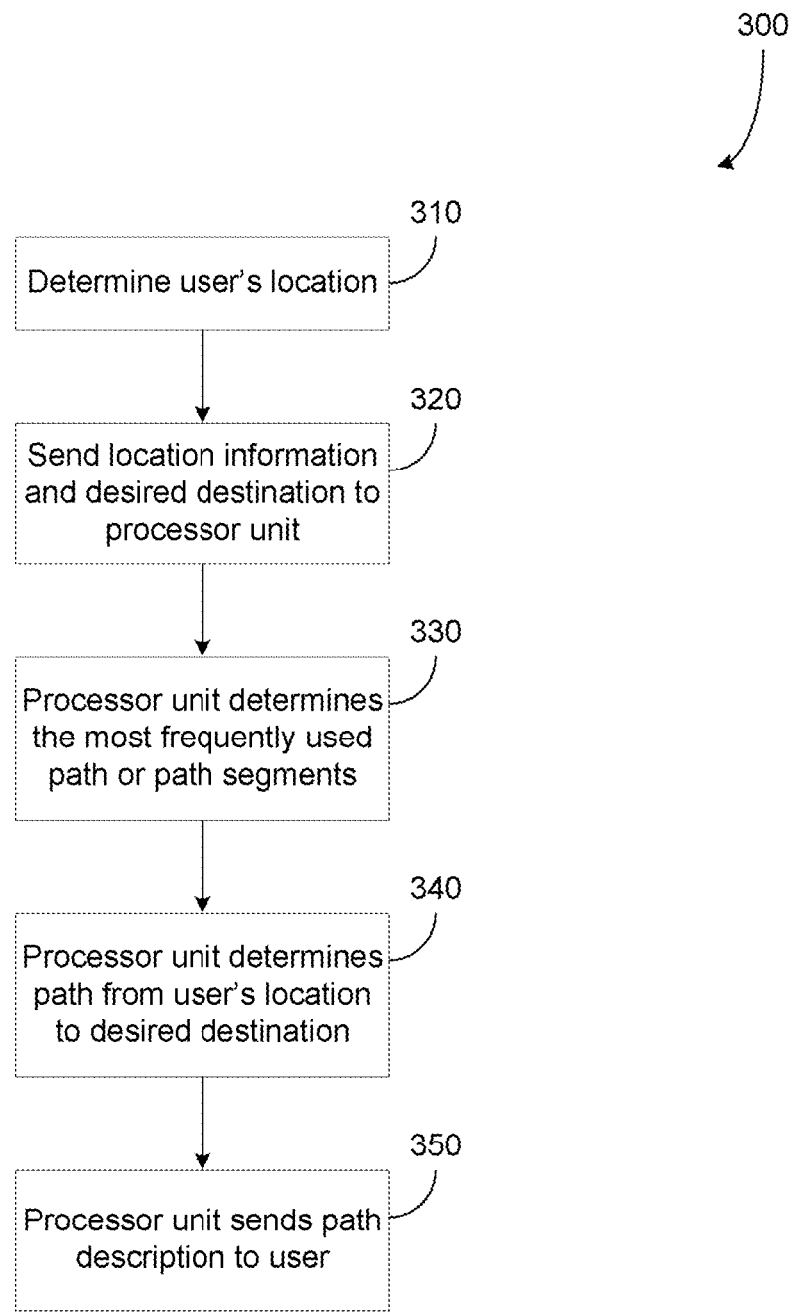
FIG. 3 is a flow chart illustrating the determination of a user's path, according to an embodiment.

The systems and methods described herein may be used to provide directions to a user. This is illustrated in FIG. 3, according to an embodiment. At 310, the user's location may be determined. This may be performed according to the process of FIG. 2, for example. At 320, the user's location information and desired destination may be sent to the processor unit, assuming that the location is calculated at the user device. If the location is calculated at the processor unit, then the location would obviously be available at the processor unit after the calculation, making the delivery of the location to the processor unit unnecessary. At 330, the processor unit may determine the most frequently used paths (or segments thereof) through the building. In an alternative embodiment, these paths may have been previously determined and their definitions stored. These paths or path segments may be used at 340, where a path from the user's location to his desired destination may be determined. In an embodiment, one or more possible paths from the user's location to his desired destination may be constructed on the basis of the building's layout. A particular path may then be chosen if it incorporates one or more of the most frequently used paths or path segments. This allows crowd-sourcing to influence determination of a path for the user. At 350, a description of the final determined path is sent to the user as a recommended path.

Figure 4:
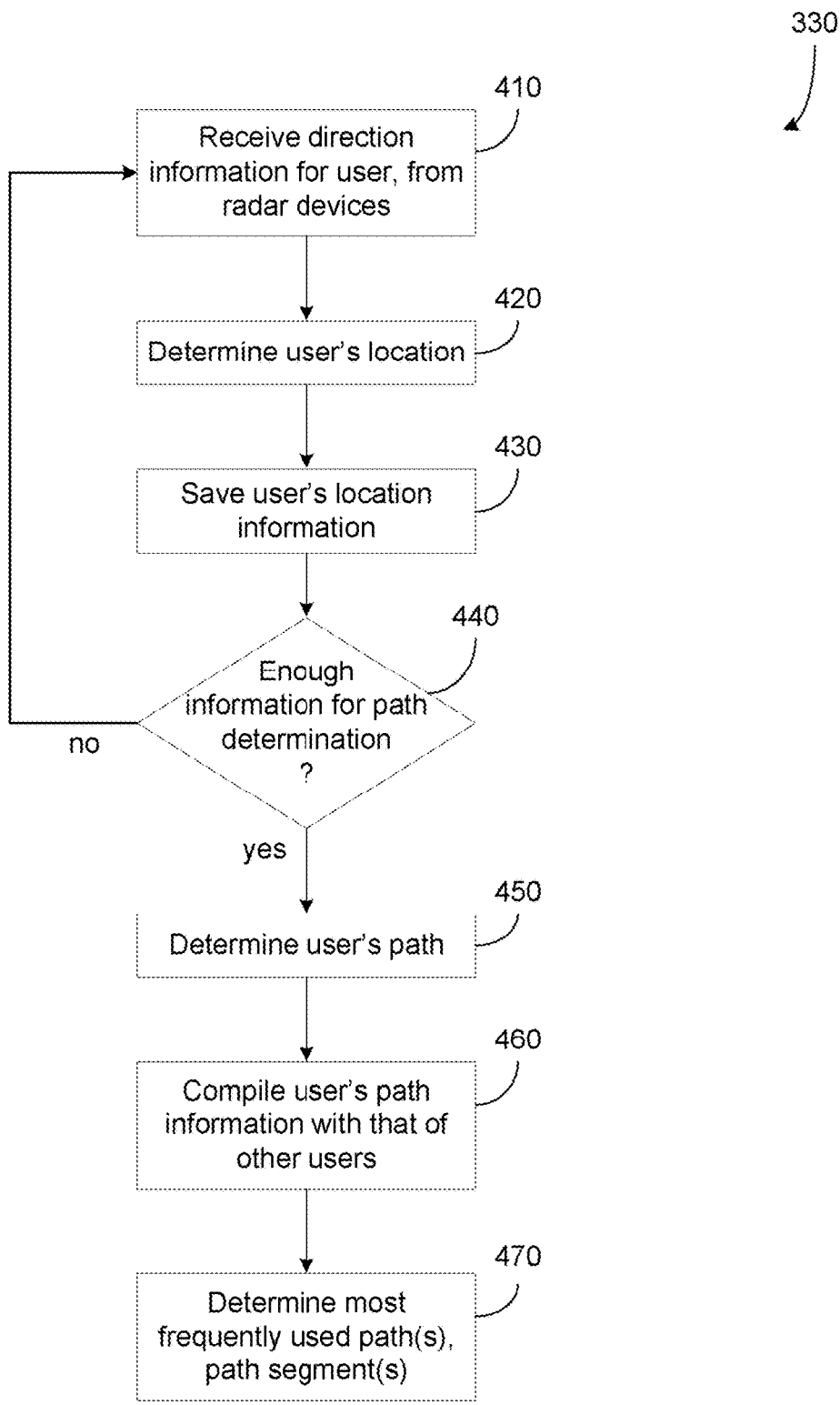
FIG. 4 is a flow chart illustrating the determination of most frequently used paths through a building, according to an embodiment.

The determination of the most frequently used paths through a building (330 of FIG. 3) is illustrated in greater detail in FIG. 4. In an embodiment, the illustrated process may be performed at the processor unit. At 410, the direction information of a user may be received from the radar devices. As discussed above, this direction information comprises the direction from which radar signals are reflected back to each radar device. At 420, the user's location may be determined from this direction information using triangulation, for example. Note that in an alternative embodiment, 410-420 may be performed at the user's device (as shown in FIG. 2) instead of being performed at the processor unit. In such an embodiment, the resulting location information may then be sent to the processor unit.

At 430 the determined location information of the user may be saved. At 440, a determination may be made as to whether enough information has been received to determine the user's path. If not, then processing may continue at 410-420, where the next location of the user may be determined. If enough information has been obtained, then processing may continue at 450. Here the user's path may be determined on the basis of the user's location information. A threshold for what constitutes enough information may be a predetermined quantity. A single location may not generally be enough to determine a path, and a short sequence of locations may likewise not be enough to determine a path. A longer sequence of locations may, on the other hand, be sufficient to determine a path. In an embodiment, an appropriate threshold may be determined empirically.

At 460, data describing the user's determined path may be compiled with similar data of other users. This may allow a determination (at 470) of the most frequently used paths or segments thereof.

For example, in a supermarket, there may be a path that most customers use when walking from the front door to the pharmacy. This path would be taken by those customers who are familiar with the store and therefore know the most direct route, e.g. using aisle 5. This would be reflected in a compilation of users' paths, and may be viewed as a crowd-sourced determination of the most practical route. Moreover, aisle 5 may represent the most efficient way to travel from the front of the store to the back, and may be used by people who need to go to that part of the building, even if their complete path takes them to a location other than the pharmacy. In this case, aisle 5 may represent a frequently used segment of a path. Determination of such path segments may also be useful in determining the most efficient path for the present user, given his desired destination.

In addition to helping the user navigate through a building, the identification of the most frequently used paths through the building may have significant commercial value. Knowing the most commonly used paths would allow for optimal advertising placement, for example, and/or would allow for practical, user-friendly organization of a store's inventory.

Figure 5:
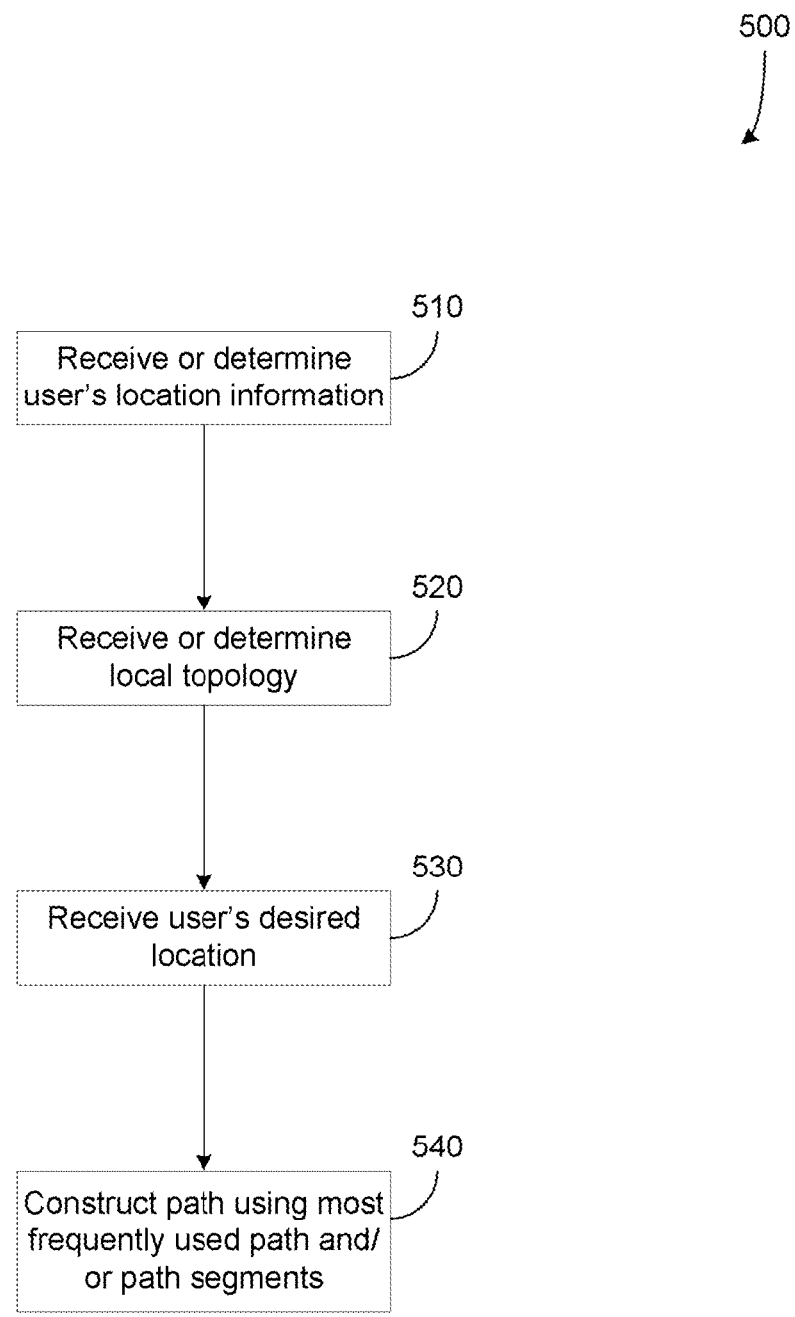
FIG. 5 is a flow chart illustrating the determination of a recommended path for a user seeking directions, according to an embodiment.

The determination of a path for a user who requests directions is illustrated in FIG. 5, according to an embodiment. In an embodiment, this determination may be performed at the processor unit. At 510, the user's location may be received or otherwise determined. Note that if the user's location is calculated at the user's device, then the user's calculated location information may be sent by the user's device and received by the processor unit. At 520, the local topology of the building may be determined. In an alternative embodiment, the topology may have been previously determined using the radar devices, or may be otherwise previously provided to the processor unit. At 530, the user's desired location may be received from the user's device after having been entered by the user. At 540, a path from the user's current location to the desired destination may be constructed. In the illustrated embodiment, such a path may be constructed using the most frequently used paths or segments thereof.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, modules composed of such elements, and so forth.

Examples of software may include software components, computer programs, application programs, system programs, machine programs, operating system software, middleware, firmware, software modules, routines, subroutines, functions, methods, procedures, software interfaces, application program interfaces (API), instruction sets, computing code, code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The terms software and firmware, as used herein, may refer to a computer program product including a computer readable medium having computer program logic stored therein to cause a computer system to perform one or more features and/or combinations of features disclosed herein. This computer program logic may represent control logic to direct the processing of the computer. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory (RAM), read-only memory (ROM), or other data storage device or tangible medium.

Figure 6:
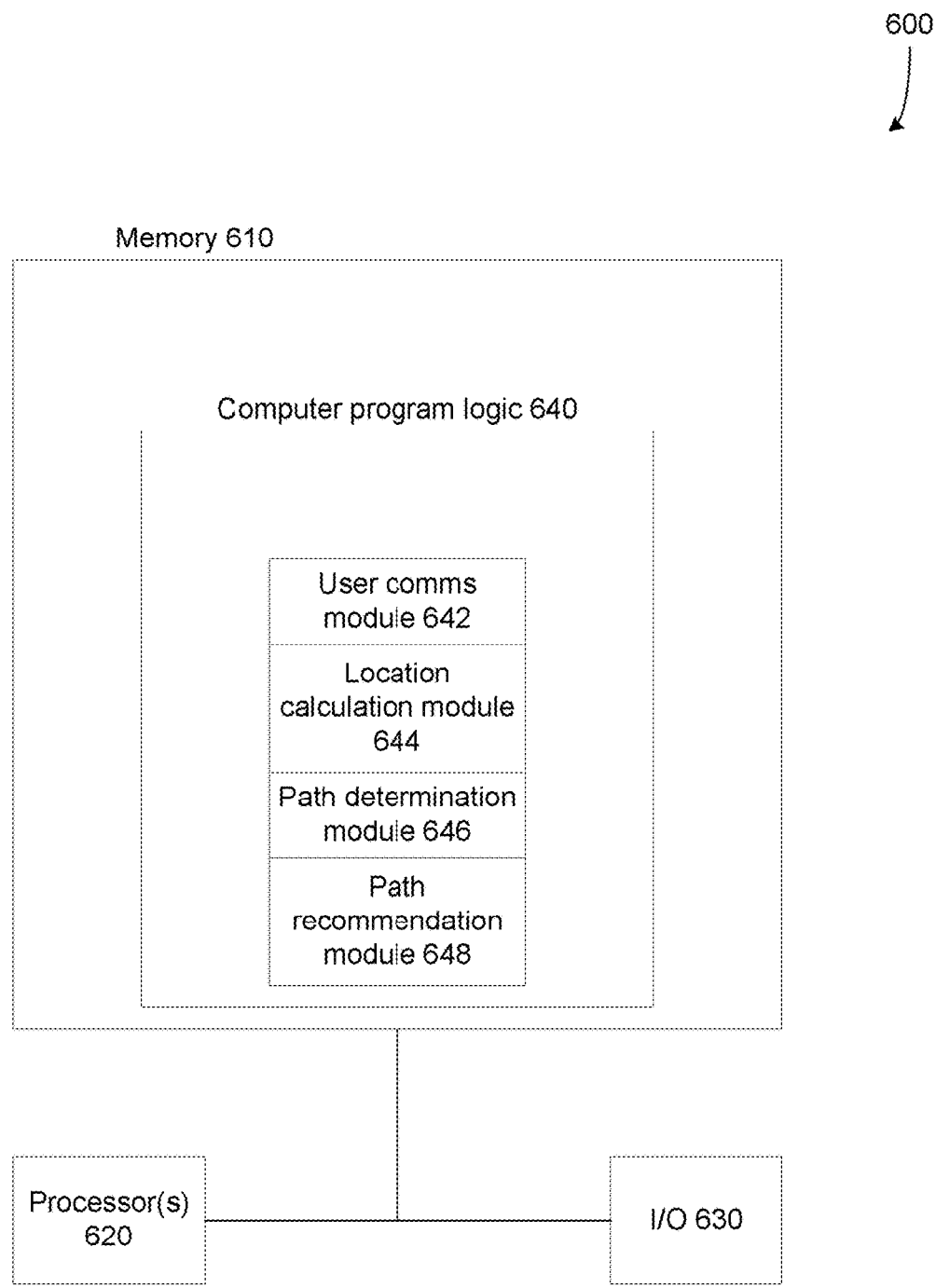
FIG. 6 is a block diagram illustrating a software or firmware embodiment.

A computing system that executes such software/firmware is shown in FIG. 6, according to an embodiment. The illustrated system 600 may represent a processor unit and may include one or more processor(s) 620 and may further include a body of memory 610. Processor(s) 620 may include one or more central processing unit cores and/or a graphics processing unit having one or more GPU cores. Memory 610 may include one or more computer readable media that may store computer program logic 640. Memory 610 may be implemented as a hard disk and drive, a removable media such as a compact disk, a read-only memory (ROM) or random access memory (RAM) device, for example, or some combination thereof. Processor(s) 620 and memory 610 may be in communication using any of several technologies known to one of ordinary skill in the art, such as a bus or point-to-point interconnect. Computer program logic 640 contained in memory 610 may be read and executed by processor(s) 620. One or more I/O ports and/or I/O devices, shown collectively as I/O 630, may also be connected to processor(s) 620 and memory 610.

Computer program logic 640 may include logic that embodies some or all of the processing described above. In the illustrated embodiment, computer program logic 640 may include a user communications module 642 to allow interaction between the processor unit and the user device. Computer program logic 640 may also include a location calculation module 644 for calculation of the user's location on the basis of the information provided by the radar devices. If the location calculation function is implemented in the processing unit (as shown here), then processor 620 may be viewed as the location processor. Alternatively, the location of the user may be calculated at the user device, and a processor incorporated therein may be viewed as the location processor.

Computer program logic 640 may also include a path determination module 646 for determination of the user's path through the building, as illustrated in FIG. 4, according to an embodiment. Computer program logic 640 may also include a module 648 for determining a recommended path for the user upon a request for directions, as illustrated in FIGS. 4 and 5, according to an embodiment.

Note that in other embodiments, modules 642-648 may be implemented in hardware, or in a combination of hardware, software, and/or firmware.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

The following examples pertain to various embodiments.

Example 1 is a system, comprising: a plurality of radar devices inside a building, each configured to determine the direction, relative to the radar device, at which a user is positioned, and a location processor configured to receive the respective directions from the radar devices, and to calculate a location of the user inside the building.

In example 2, the radar devices of example 1 comprise micropower impulse radars.

In example 3, the location processor of example 1 is incorporated into a processor unit in communication with the radar devices, wherein the processor unit is configured to send information to the user describing the location of the user.

In example 4, the location processor of example 1 is incorporated in a user device carried by the user, through which the location is communicated to the user and to a processor unit external to the user device.

In example 5, example 1 further comprises a processor unit in communication with the radar devices, wherein the processor unit is configured to determine a path of the user based on a sequence of locations of the user.

In example 6, the processor unit of example 5 is further configured to determine locations and paths of other persons who are or have been in the building.

In example 7, the processor unit of example 6 is further configured to determine frequently used paths in the building, on the basis of the paths of the other persons.

In example 8, the processor unit of example 7 is further configured to receive a description of a desired destination from the user, to determine a recommended path from the user's location to the destination, and to inform the user of the recommended path.

In example 9, the destination of example 8 is marked with and identified by a radio frequency ID (RFID) tag at the destination.

In example 10, a user device carried by the user in example 1 is marked with and identified by an RFID tag.

Example 11 is a method, comprising: at each of the plurality of radar devices inside a building, determining a direction, relative to the radar device, at which a user is positioned; and at a location processor, calculating a location of the user inside the building using the determined directions.

In example 12, the plurality of radar devices of example 11 comprises micropower impulse radars.

In example 13, example 11 further comprises: communicating the location to a user device carried by the user and to a processor unit external to the user device.

In example 14, example 11 further comprises: at a processor unit, determining a path of the user based on the sequence of locations of the user.

In example 15, example 14 further comprises: determining, at the processor unit, locations and paths of other persons who are or have been in the building.

In example 16, example 15 further comprises: determining, at the processor unit, frequently used paths in the building wherein the determination is made on the basis of the paths of the other persons.

In example 17, example 16, further comprises: receiving a description of a desired destination from the user; and determining a recommended path from the user's location to the destination, the recommended path comprising one or more of the frequently used paths.

In example 18, example 17, further comprises: informing the user of the recommended path.

Example 19 is one or more computer readable media comprising having computer control logic stored thereon, the computer control logic comprising logic configured to cause a processor to: determine a path of the user based on the sequence of locations of the user.

In example 20, example 19 further comprises logic configured to cause the processor to: calculate a location of the user inside the building using a plurality of directions determined relative to a plurality of respective radar devices, wherein the respective directions are directions at which the user's position is detected by the respective radar devices.

In example 21, example 20 further comprises logic configured to cause the processor to: communicate the location to a user device carried by the user and to a processor unit external to the user device.

In example 22, example 21 further comprises logic configured to cause the processor to: determine locations and paths of other persons who are or have been in the building.

In example 23, example 22 further comprises logic configured to cause the processor to: determine frequently used paths in the building on the basis of the paths of the other persons.

In example 24, example 23 further comprises logic configured to cause the processor to: receive a description of a desired destination from the user; and determine a recommended path from the user's location to the destination, the recommended path comprising one or more frequently used paths.

In example 25, example 24 further comprises logic configured to cause the processor to: inform the user of the recommended path.

Example 26 is a system for geolocation, comprising: a plurality of radar devices inside a building, each configured to determine the direction, relative to the radar device, at which a user is positioned, and a location processor configured to receive the respective directions from the radar devices, and to calculate a location of the user inside the building.

In example 27, the radar devices of example 26 comprise micropower impulse radars.

In example 28, the location processor of example 26 is incorporated into a processor unit in communication with the radar devices, wherein the processor unit is configured to send information to the user describing the location of the user.

In example 29, the location processor of example 26 is incorporated in a user device carried by the user, through which the location is communicated to the user and to a processor unit external to the user device.

In example 30, example 26 further comprises a processor unit in communication with the radar devices, wherein the processor unit is configured to determine a path of the user based on a sequence of locations of the user.

In example 31, the processor unit of example 30 is further configured to determine locations and paths of other persons who are or have been in the building.

In example 32, the processor unit of example 31 is further configured to determine frequently used paths in the building, on the basis of the paths of the other persons.

In example 33, the processor unit of example 32 is further configured to receive a description of a desired destination from the user, to determine a recommended path from the user's location to the destination, and to inform the user of the recommended path.

In example 34, the destination of example 33 is marked with and identified by a radio frequency ID (RFID) tag at the destination.

In example 35, a user device carried by the user in example 26 is marked with and identified by an RFID tag.

Example 36 is a method of geolocation, comprising: at each of the plurality of radar devices inside a building, determining a direction, relative to the radar device, at which a user is positioned; and at a location processor, calculating a location of the user inside the building using the determined directions.

In example 37, the plurality of radar devices of example 36 comprises micropower impulse radars.

In example 38, example 36 further comprises communicating the location to a user device carried by the user and to a processor unit external to the user device.

In example 39, example 36 further comprises: at a processor unit, determining a path of the user based on the sequence of locations of the user.

In example 40, example 39 further comprises determining, at the processor unit, locations and paths of other persons who are or have been in the building.

In example 41, example 40 further comprises: determining, at the processor unit, frequently used paths in the building wherein the determination is made on the basis of the paths of the other persons.

In example 42, example 41 further comprises: receiving a description of a desired destination from the user; and determining a recommended path from the user's location to the destination, the recommended path comprising one or more of the frequently used paths.

In example 43, example 42 further comprises informing the user of the recommended path.

Example 44 is a means for geolocation, configured to cause a processor to perform the method of any of examples 36-43.

In example 45, the processor unit of example 49 is further configured to determine locations and paths of other persons who are or have been in the building, and to determine frequently used paths in the building, on the basis of the paths of the other persons.

In example 46, the processor unit of example 45 is further configured to receive a description of a desired destination from the user, to determine a recommended path from the user's location to the destination, and to inform the user of the recommended path.

In example 47, the destination of example 46 is marked with and identified by a radio frequency ID (RFID) tag at the destination.

In example 48, example 14 further comprises: determining, at the processor unit, locations and paths of other persons who are or have been in the building; and determining, at the processor unit, frequently used paths in the building wherein the determination is made on the basis of the paths of the other persons.

In example 49, example 48 further comprises: receiving a description of a desired destination from the user; and determining a recommended path from the user's location to the destination, the recommended path comprising one or more of the frequently used paths.

Example 50 is one or more computer readable media comprising having computer control logic stored thereon, the computer control logic comprising logic configured to cause a processor to perform a method of any of claims 11-18.

What is claimed is:

1. A system, comprising, a processor and memory configured to:
   compute directions from which radar returns from animate bodies are received at radar devices installed at predetermined locations within a building, wherein the radar devices are configured to transmit radar pulses from and receive radar returns at the respective predetermined locations within the building without necessitating the animate bodies to hold or wear the radar devices or a transducer; and
   compute locations of the animate bodies relative to a floorplan of the building based on the computed directions and the predetermined locations of the radar devices with the building;
   track movements of the animate bodies relative to the floorplan based on the computed locations of the animate bodies;
   determine frequently used paths of the floorplan based on the tracked movements of the animate bodies;
   determine a suggested path for an additional animate body, from a location of the additional animate body within the building to another location within the building, based on the frequently used paths; and
   provide the suggested path to a wireless communication device associated with the additional animate body.

2. The system of claim 1, wherein the radar devices include micro-power impulse radar devices installed at the predetermined locations within the building.

3. The system of claim 1, wherein the processor and memory are further configured to:
   detect inanimate objects within the building based on radar returns from the inanimate objects received at the radar devices installed at the predetermined locations within the building, wherein the inanimate objects include one or more of a support structure of the building, a wall of the building, a partition within the building, and a shelf within the building; and
   construct the floorplan based on the detected inanimate objects.

4. The system of claim 1, wherein the processor and memory include a server-based processor and memory configured to:
   compute the directions from which the radar returns from the animate bodies are received at the radar devices installed at the predetermined locations within the building; and
   provide the computed directions to wireless communication devices that are associated with the animate bodies and configured to compute the locations of the animate bodies.

5. The system of claim 1, wherein the processor and memory are further configured to:
   compute subsequent locations of the animate bodies relative to the floorplan based on directions from which subsequent radar returns from the respective animate bodies are received at the radar devices installed at the predetermined locations within the building; and
   determine directions of travel of the respective animate bodies, relative to the floorplan, based on the locations of the animate bodies and the subsequent location of the respective animate bodies.

6. The system of claim 1, wherein the processor and memory are further configured to:

track movements of the additional animate body relative to the floorplan based on computed locations of the additional animate body relative to the floorplan; and determine the suggested path for the additional animate body based further on the tracked movements of the additional animate body.

7. A method, comprising:

computing directions from which radar returns from animate bodies are received at radar devices installed at predetermined locations within a building, wherein the radar devices are configured to transmit radar pulses from and receive radar returns at the respective predetermined locations within the building without necessitating the animate bodies to hold or wear the radar devices or a transducer; and computing locations of the animate bodies relative to a floorplan of the building based on the computed directions and the predetermined locations of the radar devices within the building;

tracking movements of the animate bodies relative to the floorplan based on the computed locations of the animate bodies;

determining frequently used paths of the floorplan based on the tracked movements of the animate bodies;

determining a suggested path for an additional animate body, from a location of the additional animate body within the building to another location within the building, based on the frequently used paths; and providing the suggested path to a wireless communication device associated with the additional animate body.

8. The method of claim 7, wherein the radar devices include micro-power impulse radar devices installed at the predetermined locations within the building.

9. The method of claim 7, further including:

detecting inanimate objects within the building based on radar returns from the inanimate objects received at the radar devices installed at the predetermined locations within the building, wherein the inanimate objects include one or more of a support structure of the building, a wall of the building, a partition within the building, and a shelf within the building; and constructing the floorplan based on the detected inanimate objects.

10. The method of claim 7, further including:

performing the computing directions in a computer server; and providing the computed directions to wireless communication devices that are associated with the animate bodies and configured to compute the locations of the animate bodies.

11. The method of claim 7, further including:

computing subsequent locations of the animate bodies relative to the floorplan based on directions from which subsequent radar returns from the animate bodies are received at the radar devices installed at the predetermined locations within the building; and determining directions of travel of the animate bodies, relative to the floorplan, based on the locations of the animate bodies and the subsequent locations of the animate bodies.

12. The method of claim 7, further including:

tracking movements of the additional animate body relative to the floorplan based on computed locations of the additional animate body relative to the floorplan; and computing the suggested path for the additional animate body based further on the tracked movements of the additional animate body.

13. A non-transitory computer readable medium encoded with a computer program that includes instructions to cause a processor to:

compute directions from which radar returns from animate bodies are received at radar devices installed at predetermined locations, wherein the radar devices are configured to transmit radar pulses from and receive radar returns at the respective predetermined locations within a building without necessitating the animate bodies to hold or wear the radar devices or a transducer; and compute locations of the animate bodies relative to a floorplan of the building based on the computed directions and the predetermined locations of the radar devices with the building;

track movements of the animate bodies relative to the floorplan based on the computed locations of the animate bodies;

determine frequently used paths of the floorplan based on the tracked movements of the animate bodies;

determine a suggested path for an additional animate body, from a location of the additional animate body within the building to another location within the building, based on the frequently used paths; and provide the suggested path to a wireless communication device associated with the additional animate body.

14. The non-transitory computer readable medium of claim 13, wherein the radar devices include micro-power impulse radar devices installed at the predetermined locations within the building.

15. The non-transitory computer readable medium of claim 13, further including instructions to cause the processor to:

detect inanimate objects within the building based on radar returns from the inanimate objects received at the radar devices installed at the predetermined locations within the building, wherein the inanimate objects include one or more of a support structure of the building, a wall of the building, a partition within the building, and a shelf within the building; and construct the floorplan based on the detected inanimate objects.

16. The non-transitory computer readable medium of claim 13, further including instructions to cause a server-based processor to:

compute the directions from which the radar returns from the animate bodies are received at the radar devices installed at the predetermined locations within the building; and provide the computed directions to wireless communication devices that are associated with the animate bodies and configured to compute the locations of the animate bodies.

17. The non-transitory computer readable medium of claim 13, further including instructions to cause the processor to:

compute subsequent locations of the animate bodies relative to the floorplan based on directions from which subsequent radar returns from the animate bodies are received at the radar devices installed at the predetermined locations within the building; and determine directions of travel of the animate bodies, relative to the floorplan, based on the locations of the animate bodies and the subsequent locations of the animate bodies.

18. The non-transitory computer readable medium of claim 13, further including instructions to cause the processor to:
- track movements of the additional animate body relative to the floorplan based on computed locations of the additional animate body relative to the floorplan; and
- determine a suggested path for the additional animate body based further on the tracked movements of the additional animate body.

* * * * *